(12) United States Patent
Lee et al.

(10) Patent No.: US 6,230,246 B1
(45) Date of Patent: May 8, 2001

(54) NON-INTRUSIVE CRASH CONSISTENT COPYING IN DISTRIBUTED STORAGE SYSTEMS WITHOUT CLIENT COOPERATION

(75) Inventors: Edward K. Lee; Chandramohan A. Thekkath, both of Palo Alto, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/016,320

(22) Filed: Jan. 30, 1998

(51) Int. Cl.[7] .................................................. G06F 12/14
(52) U.S. Cl. .......................................... 711/167; 711/162
(58) Field of Search .................................... 711/162, 148, 711/114, 150, 152, 161, 163; 714/4, 2; 710/4; 709/104, 213

(56) References Cited

U.S. PATENT DOCUMENTS

| | | | |
|---|---|---|---|
| 5,133,065 | * | 7/1992 | Cheffetz et al. .......................... 714/2 |
| 5,642,496 | * | 6/1997 | Kanfi et al. ............................ 711/162 |
| 5,787,480 | * | 7/1998 | Scales et al. .......................... 711/148 |
| 5,881,311 | * | 3/1999 | Woods et al. ............................. 710/4 |
| 5,894,555 | * | 4/1999 | Harada et al. .......................... 709/213 |
| 5,901,312 | * | 5/1999 | Radko et al. .......................... 709/104 |
| 5,909,540 | * | 6/1999 | Carter et al. ............................. 714/4 |
| 5,948,062 | * | 9/1999 | Tzelnic et al. ......................... 709/219 |

FOREIGN PATENT DOCUMENTS 0 405 861   1/1991  (EP) .
0 769 741   4/1997  (EP) .

* cited by examiner

Primary Examiner—Kevin L. Ellis
(74) Attorney, Agent, or Firm—Oppenheimer Wolff & Donnelly LLP

(57) ABSTRACT

A method for controlling access to a storage element that forms a portion of a logical storage device includes setting a write-barrier value to a first value upon receiving a request to copy the contents of the logical storage device. Write operations to the storage element are prohibited with the write-barrier value set to the first value. The portions of the logical storage device associated with the storage element are then copied. Upon the completion of the copying, the write-barrier value is then set to a second value.

10 Claims, 4 Drawing Sheets

NON-INTRUSIVE CRASH CONSISTENT COPYING IN DISTRIBUTED STORAGE SYSTEMS WITHOUT CLIENT COOPERATION

FIELD OF THE INVENTION

The present invention relates generally to distributed storage systems and more particularly to non-intrusive crash consistent copying in a distributed storage system without client cooperation.

BACKGROUND

Techniques have been developed to efficiently store information in a computer network. For example, the physical storage elements of a group of computer storage servers can be used to form a logical storage device, commonly referred to as a "virtual disk." The virtual disk is functionally equivalent to a single physical storage element but is actually formed of several physical storage elements.

For reasons analogous to the reasons why information stored at a physical storage element must be backed-up, the information stored at a virtual disk must also be backed-up. Because of the distributed nature of a virtual disk, however, special care must be taken to ensure that the same "version" of the virtual disk is copied from each of the physical storage elements that form the virtual disk.

To ensure consistency between the original and back-up copies of a virtual disk, prior to copying the virtual disk, the entire computer storage system is conventionally placed into a quiescent state. This basically causes the computer storage system to become inactive. The copy operation is permitted only after the computer storage system has reached quiescence. This procedure, although ensuring consistency between copies of a virtual disk, significantly intrudes on the normal operation of the computer storage system, including operations unrelated to the making of the copies. Accordingly, it would be advantageous to be able to copy virtual disks without intruding on normal computer storage system operations.

OBJECT OF THE INVENTION

It is, accordingly, an object of the present invention to provide a technique for copying the contents of a virtual disk without interfering with normal operation of a distributed storage system.

It is another object of the present invention to provide further advantages and features, the details of which shall be described below.

SUMMARY OF THE INVENTION

The present invention advantageously provides an apparatus and an associated method for controlling access to storage elements within a physical storage device when an associated logical storage device, which can be formed of a number of physical storage elements, for example, storage elements distributed across multiple computing nodes connected by a network, is being copied.

In accordance with the invention, a memory stores a write-barrier value and a processor prohibits write operations on an associated storage element. In operation, a write-barrier value of a first state, for example 0, is stored in the memory when the logical storage device is to be copied. While the stored write-barrier value is in the first state, the execution of write operations to the storage element(s) associated with the memory is prohibited by the processor. Advantageously, the write-barrier value stored in the memory is set to the first state by the processor upon the receipt of a request to copy the logical storage device. The copying of the logical storage device may be automatically initiated by the processor.

After the write-barrier value is set to 0, portions of the logical storage device are copied, and finally, the write-barrier value that was previously set to the first state is set to a second state for example, to 1. While the write-barrier value is set to 1, write operations upon the associated storage element can be executed in a normal fashion, i.e., are no longer prohibited by the processor.

Preferably, the logical storage device can only be copied when the write-barrier value stored in the memory is in the first state, i.e., 0. The logical storage device is copied by a copy-on-write technique which avoids the often cumbersome process of completely copying each file.

DETAILED DESCRIPTION OF PREFERRED EMBODIMENT

Figure 1:
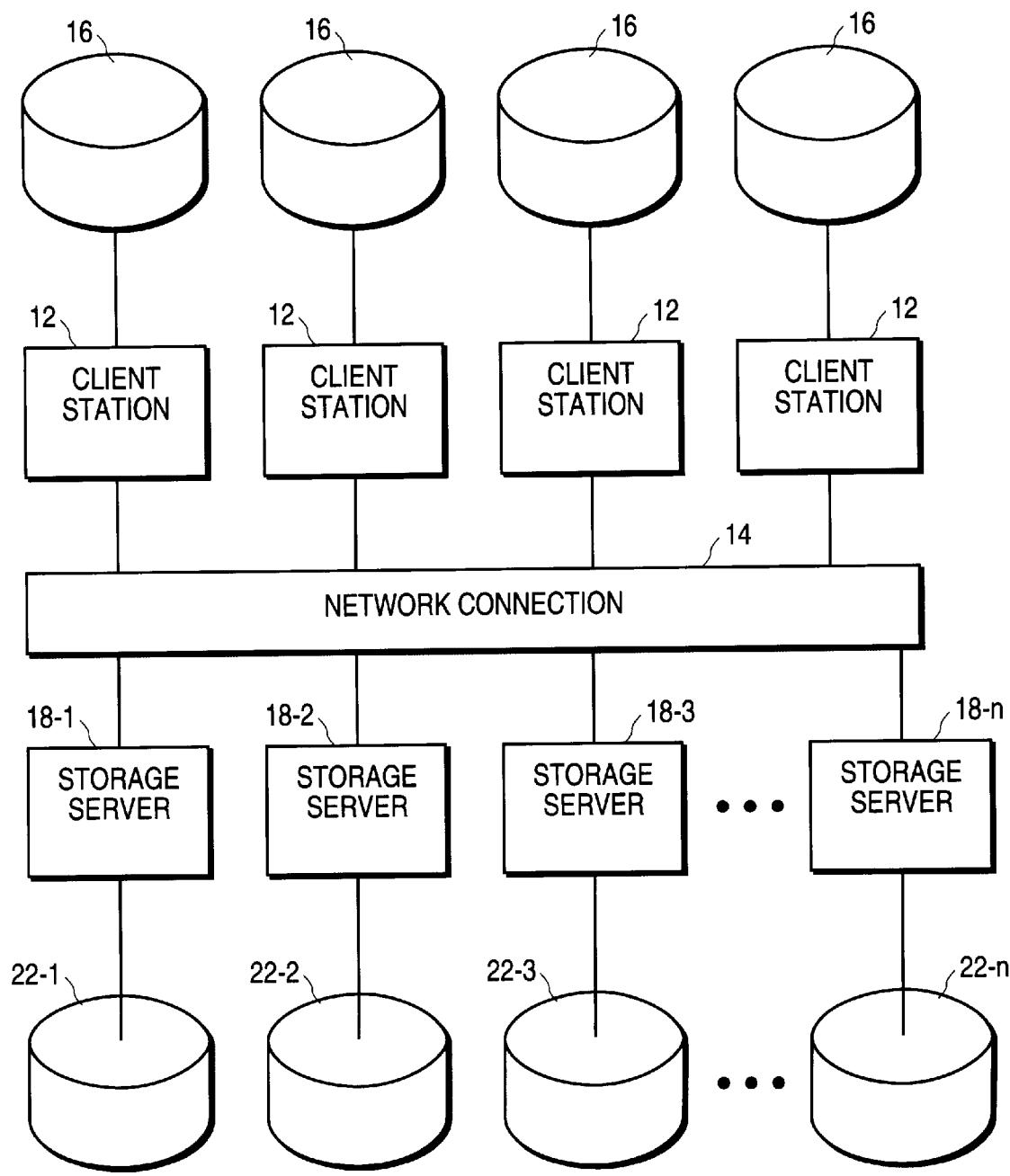
FIG. 1 illustrates a computer network formed of a plurality of client stations connected by way of network connections to a plurality of storage servers, each including hard disk drive assemblies.

Referring first to FIG. 1, a computer network, shown generally at 10, provides distributed processing capability to a plurality of users. The network 10 includes a plurality of networked computers at client stations 12. The client stations 12 are connected together by network connections 14. The client stations 12 can be formed of personal computers, work stations, or other types of processing devices. Each of the client stations includes bulk storage media, here represented by disk drive assemblies 16. The computer network 10 is scalable, permitting additional client stations to be added to the network.

The computer network further includes a plurality of network storage servers 18, here servers 18-1, 18-2, 18-3, . . . 18-n. The servers 18 are each also coupled by way of the network connections 14. The client stations 12 are able to access the servers 18 by way of the network connections 14. Each of the servers 18 includes bulk storage media 22, here hard disks 22-1, 22-2, 22-3, . . . 22-n. During operation of the computer network 10, information stored at the hard disks 22 is accessible for executing read operations and write operations.

Figure 2:
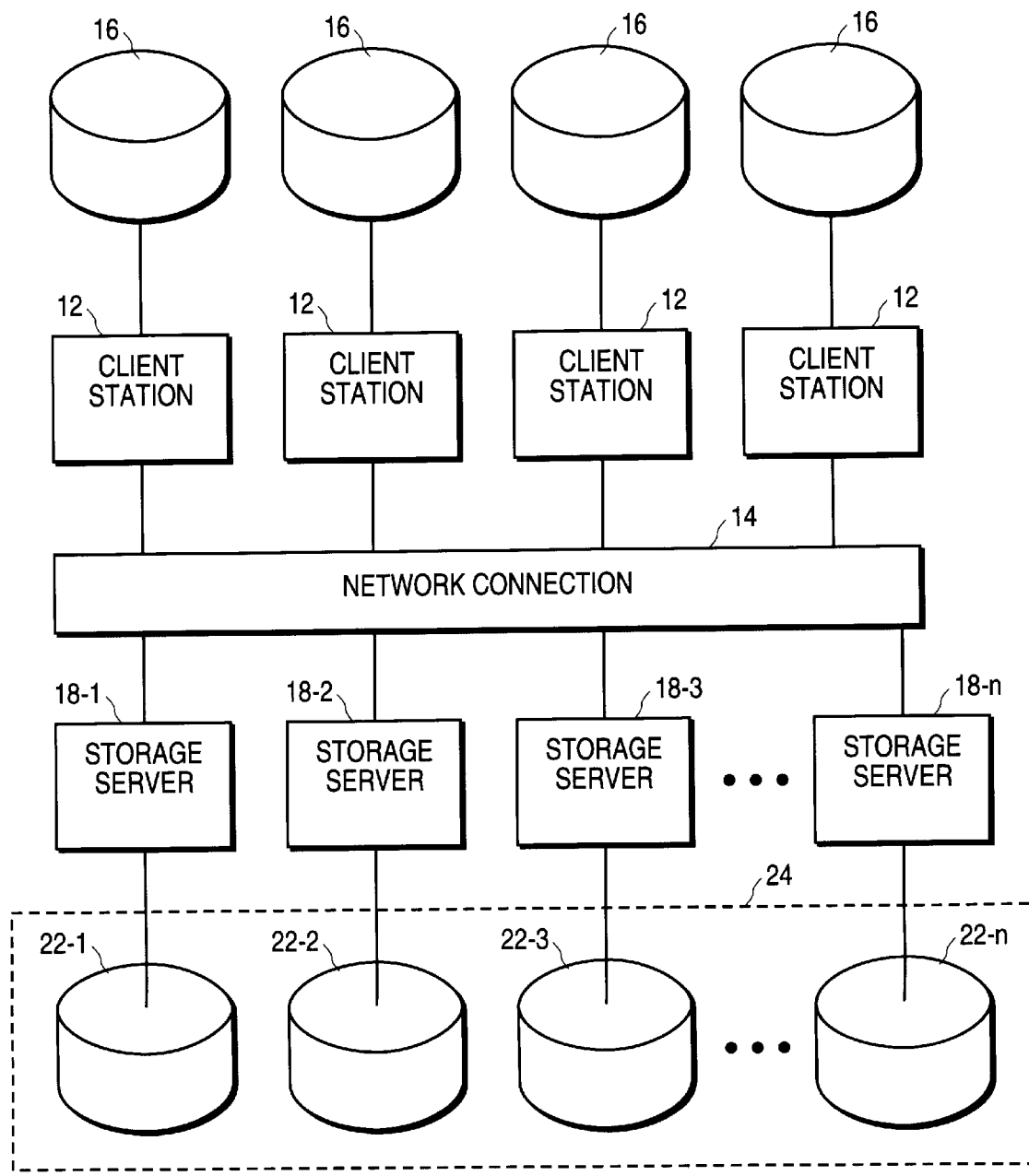
FIG. 2 illustrates a virtual disk formed of portions of hard disk drive assemblies of FIG. 1, in accordance with the present invention.

The computer network 10 is illustrated in FIG. 2 to include a virtual disk 24. Portions of the storage media 22 form the virtual disk 24. Further, the servers 18 shown in FIG. 1 are also utilized in forming the virtual disk. The virtual disk 24 forms a logical storage device to which a client station 12 can write and from which a client station 12 can read information.

Figure 3:
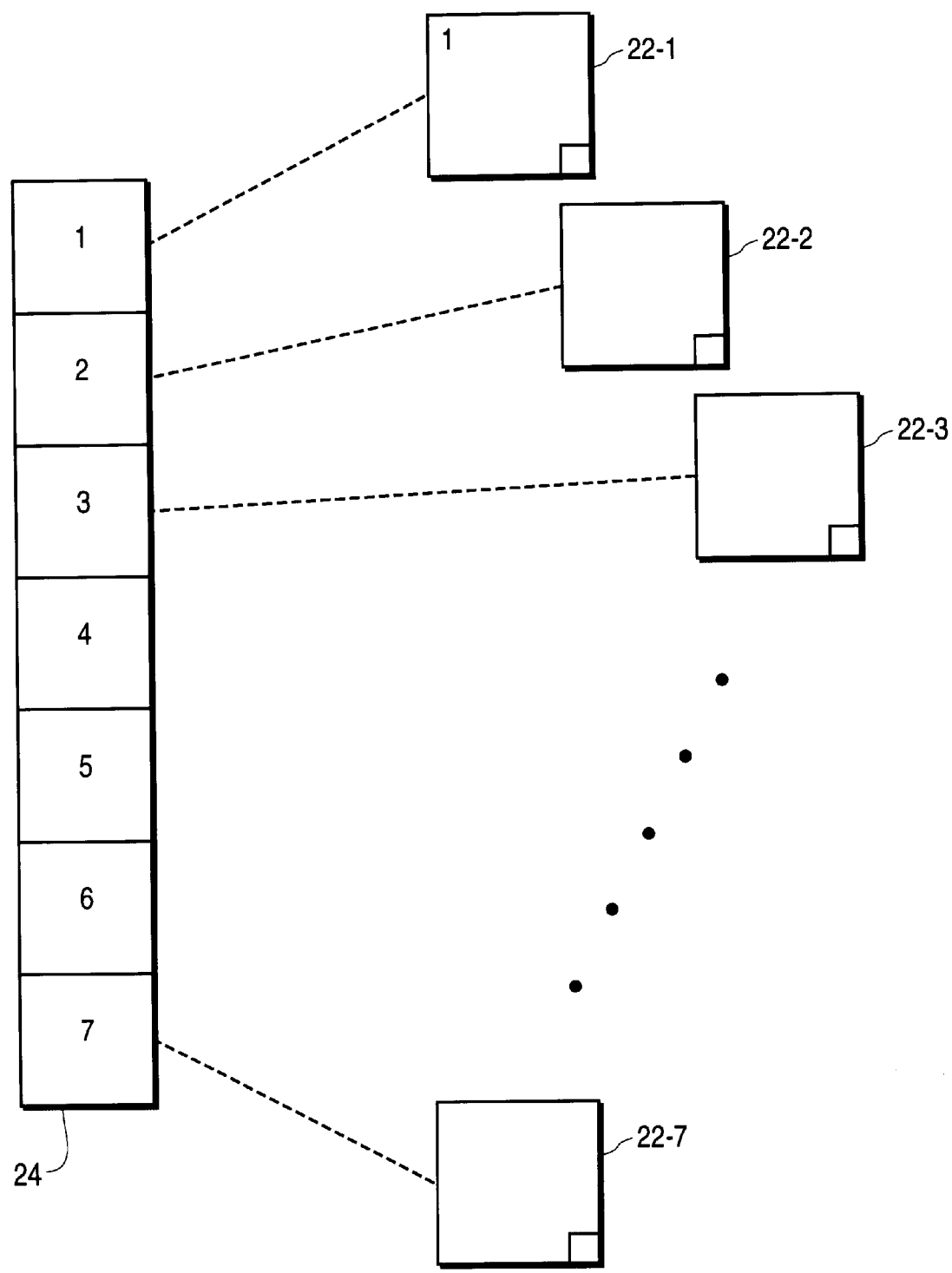
FIG. 3 illustrates the relationship between the virtual disk and hard disk drive assemblies at which the virtual disk is stored in accordance with the present invention.

FIG. 3 illustrates the relationship between the virtual disk 24 and the storage media 22, shown in FIG. 2. The virtual disk 24 is here shown to be formed of a plurality of consecutively-numbered files numbered 1–7. The files 1–7 are mapped to individual ones of the storage media 22. A one-to-one relationship between the files 1–7 and their respective physical storage locations are exemplary only. Although, as shown, each of the files 1–7 is shown to be stored entirely on a respective single hard disk 22 associated with a single server 18, two or more files, e.g., files 1 and 2, might be commonly stored at a single hard drive 22 or portions of a single file, e.g., file 1, might be distributed across two or more hard disks 22.

When the contents of the virtual disk 24 are to be copied, a copy-on-write technique can be utilized. Using this technique, physical copies of all of the files 1–7 of the disk 24 need not be replicated. Rather, the copy need only be a logical copy of those portions of the hard disks 22 storing files which are dissimilar to the files 1–7 stored on the virtual disk being replicated. The logical copy is often referred to as a "snapshot" of the virtual disk 24. The snapshot of the virtual disk includes a pointer having mapping information to map back to changed portions of the virtual disk 24 and, in turn, back to the locations on hard disks 18 at which the information is physically stored.

Figure 4:
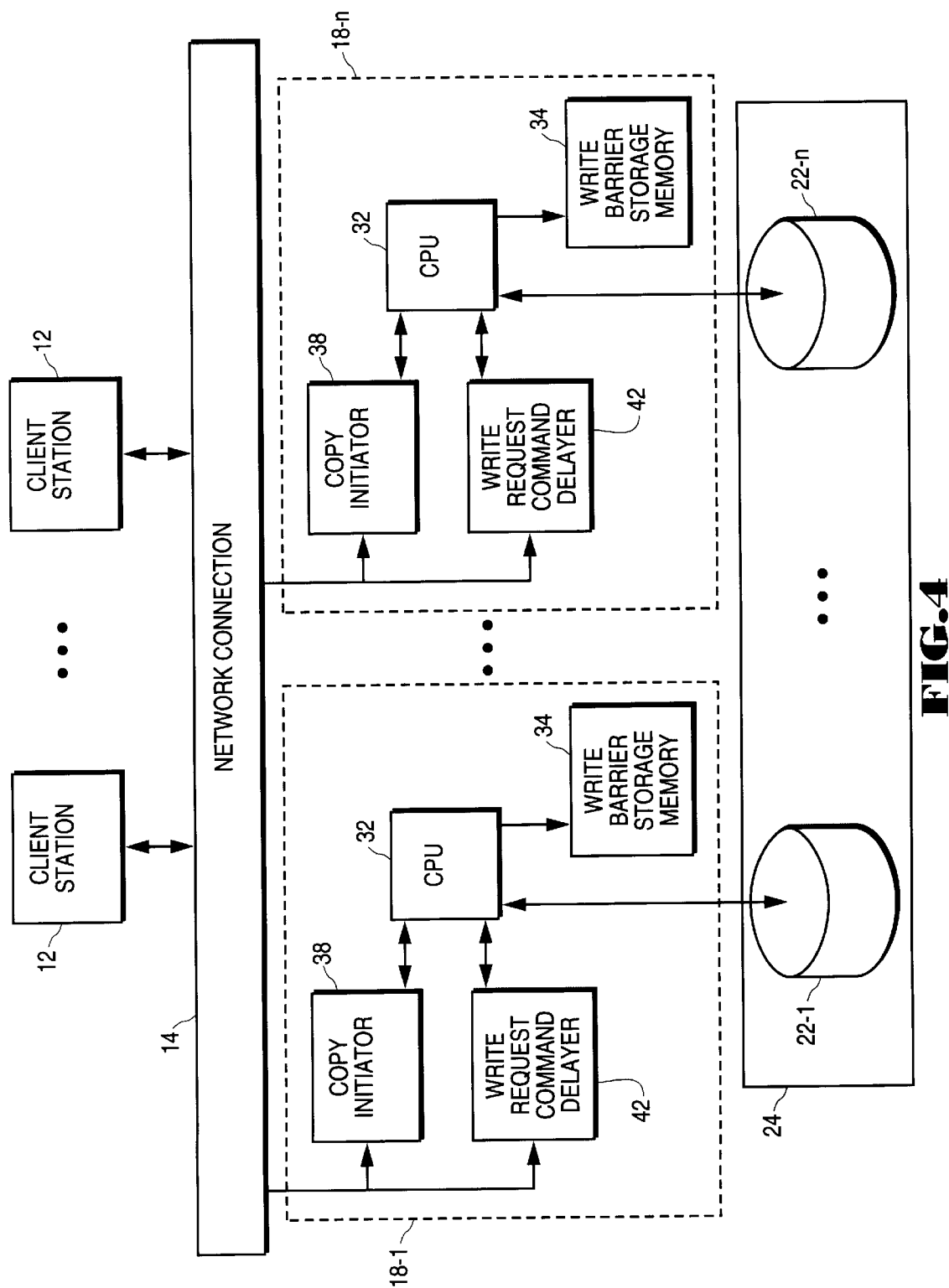
FIG. 4 illustrates a simplified functional block diagram of the storage servers in the computer network shown in FIG. 1, in accordance with the present invention.

FIG. 4 illustrates the computer network 10 in somewhat greater detail. As shown, the servers 18-1 and 18-n each include a CPU (central processing unit) 32. The CPUs 32 are independently operable to perform functions including the control of the respective storage server's operation.

Each of the storage servers 18, of which the servers 18-1 and 18-n are exemplary, includes a write-barrier storage memory 34. The value stored at the write-barrier storage memory is determinists of whether a write operation to an associated hard disk 22 can be executed. For example, when the bit, e.g., zero, stored at the write-barrier storage memory 34 is of a first logical value, a write operation cannot be performed, and when the bit, e.g., one, stored at the write-barrier storage memory 34 is of a second logical value, the write operation can be executed.

The storage servers 18 are further shown to include a copy initiator 38, here implemented as programmed instructions executable by the CPU 32. The copy initiator 38 is signaled by a CPU 32 when a copy of the virtual disk 24 is to be created. Copying is initiated at preselected intervals, such as every ten minutes, or upon request of a client station 12. Execution of the copy initiator 38 by the CPU 32 causes the write-barrier storage bit to be set as the first logical value, for example the bit may be flipped from 1 to 0. The CPU 32 also executes the copy initiator 38 to reset, i.e., "tear down", the write-barrier storage bit to a second logical value, for example, to flip the bit from 0 to 1, after the contents of the hard disk 22 associated with the flipped write-barrier storage bit has been replicated.

The storage servers 18 each further include a write request command delayer 42. Each write request command delayer 42 is implemented by programmed instructions executable by the CPU 32. The write request command delayer 42 receives requests to write data to the associated hard disk 18 which forms portions of the virtual disk 24. When a write request is received at a server 18 and the write-barrier storage bit is set at the first logical value, the write request is delayed by the write request command delayer 42 until the copy initiator 38 resets the write-barrier storage bit at the write-barrier storage location 34. Thereafter, write operations at the hard disk 22 can be performed without waiting for the associated other hard disks 22 of virtual disk 24 to be copied.

The previous description is of preferred examples for implementing the invention, and the scope of the invention should not necessarily be limited by this description. The scope of the present invention is defined by the following claims.

What is claimed is:

1. A computer system for non-intrusive copying of a distributed storage system, the computer system comprising:

a plurality of storage devices for storing data, the plurality of storage devices forming a portion of a distributed storage system;

a plurality of storage servers, individual ones of the plurality of storage servers connected to and operably associated with individual ones of the plurality of storage devices wherein a one-to-one relationship is established between each individual one of the plurality of storage devices and each individual one of the plurality of storage servers;

a plurality of write-barrier indicator storage elements, each being configured to include at least one bit indicative of a write-barrier state or a no-write-barrier state and each individual ones of the plurality of write-barrier indicator storage elements being operably associated with individual ones of the plurality of storage devices and operably associated with individual ones of the plurality of storage servers wherein a one-to-one relationship is established between the individual ones of the plurality of storage devices and the individual ones of the plurality of write-barrier indicator storage elements; and a backup storage device connected to the plurality of storage devices, the back-up storage device for storing at least an indication of the data stored at the plurality of storage devices;

wherein a first of the plurality of write-barrier indicator storage element is associated with a first of the plurality of storage devices and the first of the plurality of write-barrier indicator storage elements includes a bit indicating the write-barrier state thereby preventing writes to the first of the plurality of storage devices until the contents of the first of the plurality of storage devices have been replicated to the backup storage devices, the write-barrier state being established in association with a transfer of at least an indication of data stored at the first of the plurality of storage devices from the first of the plurality of storage devices to the back-up storage device; and wherein the ones of the plurality of write-barrier indicator storage elements other than the first of the plurality of write-barrier indicator storage elements each simultaneously include a bit indicating a no-write-barrier state for each of the operably associated individual ones of the plurality of storage devices, thereby permitting writes to the individual ones of the plurality of storage devices operably associated with the ones of the plurality of write-barrier indicator storage elements.

2. The computer system of claim 1, wherein each of the plurality of write-barrier indicator storage elements is included in a separate memory.

3. The computer system of claim 2, wherein the first of the plurality of storage devices includes an array of storage devices.

4. The computer system of claim 2, further comprising a network, the network connected with the plurality of storage servers wherein the network is configured to transfer data to at least one of the plurality of storage devices through an associated one of the plurality of storage servers when the first of the plurality of write-barrier indicator storage elements that is associated with the first of the plurality of storage devices includes a bit indicating the write-barrier state thereby preventing writes to the first of the plurality of storage devices.

5. A computer system for copying the contents of a virtual disk, the computer system comprising:

a first storage device for storing data;

a first write-barrier storage device connected to the first storage device and operably associated with the first storage device, the first write-barrier storage device for storing a write-barrier indicator;

a first processor connected to the first write-barrier storage device, the first processor for setting the first write-barrier indicator thereby prohibiting writes to the first storage device while the contents of the first storage device are being replicated to a back-up storage device;

a second storage device connected to the first storage device, the second storage device and the first storage device forming a virtual storage device;

a second write-barrier storage device connected to the second storage device ad operably associated with the second storage device, the second write-barrier storage device for storing a second write-barrier indicator; and a second processor connected to the second write-barrier storage device, the second processor for setting the second write-barrier indicator thereby prohibiting writes to the second storage device;

wherein the first processor is configured to set the first write-barrier indicator independently of the second processor setting the second write-barrier indicator thereby prohibiting writes to the first storage device and permitting writes to the second storage device.

6. The computer system of claim 5, wherein the first write-barrier storage device is interposed between the first processor and the first storage device.

7. The computer system of claim 5, wherein the first write-barrier storage device is associated with the first storage device in a one-to-one relationship.

8. The computer system of claim 5, further comprising a back-up storage device configured to receive at least an indication of the data stored at the first storage device responsive to the first write-barrier indicator being set by the first processor.

9. The computer system of claim in further comprising a network connected to the first storage device and the second storage device.

10. The computer system of claim 9, wherein data can be transferred from the network to the second storage device when the first write-barrier indicator is set.

* * * * *

UNITED STATES PATENT AND TRADEMARK OFFICE
CERTIFICATE OF CORRECTION

PATENT NO. : 6,230,246 B1
APPLICATION NO. : 09/016320
DATED : May 8, 2001
INVENTOR(S) : Lee et al.

It is certified that error appears in the above-identified patent and that said Letters Patent is hereby corrected as shown below:

In the specification, Column 3, line 33 reads:
"memory is determinists of whether a write operation to an";
It should read:
--memory is determinative of whether a write operation to an--

In the claims, Claim 1, column 4, line 36, reads:
"storage elementis associated with a first of the plurality";
It should read:
--storage elements is associated with a first of the plurality--

In the claims, Claim 5, column 5, line 24, reads:
"second storage device ad operably associated with the";
It should read:
--second storage device and operably associated with the--

In the claims, Claim 9, column 6, line 20, reads:
" 9. The computer system of claim in further comprising a"
It should read:
-- 9. The computer system of claim 5, further comprising a--

Signed and Sealed this

Tenth Day of July, 2007

JON W. DUDAS
*Director of the United States Patent and Trademark Office*